(12) United States Patent
Miron

(10) Patent No.: US 10,114,547 B2
(45) Date of Patent: Oct. 30, 2018

(54) CONTEXT-BASED KEYBOARD

(71) Applicant: SUPER DERIVATIVES, INC., New York, NY (US)

(72) Inventor: Amihi Miron, Kiriat Ono (IL)

(73) Assignee: SUPER DERIVATIVES, INC., New York, NY (US)

( * ) Notice: Subject to any disclaimer, the term of this patent is extended or adjusted under 35 U.S.C. 154(b) by 115 days.

(21) Appl. No.: 14/939,257

(22) Filed: Nov. 12, 2015

(65) Prior Publication Data

US 2016/0291863 A1    Oct. 6, 2016

Related U.S. Application Data

(63) Continuation of application No. 13/419,596, filed on Mar. 14, 2012, now abandoned.
(Continued)

(51) Int. Cl.
   *G06F 3/0488*    (2013.01)
   *G06Q 40/06*    (2012.01)
   (Continued)

(52) U.S. Cl.
   CPC ........ *G06F 3/04886* (2013.01); *G06F 3/0238* (2013.01); *G06Q 40/04* (2013.01); *G06Q 40/06* (2013.01)

(58) Field of Classification Search
   CPC ...... G06Q 40/04; G06Q 40/06; G06F 3/0238; G06F 3/04886
   See application file for complete search history.

(56) References Cited

U.S. PATENT DOCUMENTS

| 4,971,406 A | 11/1990 | Hanson |
| 2003/0033239 A1* | 2/2003 | Gilbert ................. G06Q 40/04 705/37 |

(Continued)

FOREIGN PATENT DOCUMENTS

| EP | 0749079 | 12/1996 |
| EP | 2163973 | 3/2010 |

(Continued)

OTHER PUBLICATIONS

Office Action for Chinese Patent Application No. 201280018274.2, dated Jul. 29, 2016, 7 pages.
(Continued)

*Primary Examiner* — Jennifer N To
*Assistant Examiner* — Amy P Hoang
(74) *Attorney, Agent, or Firm* — Shichrur & Co.

(57) ABSTRACT

Some demonstrative embodiments, include devices, systems and/or methods of context-based keyboards. For example, a virtual context-based keyboard may be customized based on an input context to be provided from a user to at least one application. The input context may include a predefined combination of a plurality of context components including input elements selected from a respective plurality of predefined sets of input elements, such that a context component has an input element selected from a set of input elements corresponding to the context component. The virtual keyboard may include a plurality of keyboard elements representing input elements of the plurality of sets of input elements, each keyboard element representing a different input element.

16 Claims, 10 Drawing Sheets

Related U.S. Application Data

(60) Provisional application No. 61/452,222, filed on Mar. 14, 2011.

(51) Int. Cl.
*G06F 3/023* (2006.01)
*G06Q 40/04* (2012.01)

(56) References Cited

U.S. PATENT DOCUMENTS

| | | |
|---|---|---|
| 2004/0117331 A1 | 6/2004 | Lutnick et al. |
| 2004/0212595 A1 | 10/2004 | Zhou |
| 2005/0171893 A1* | 8/2005 | Gaer ............ G06Q 30/00 705/37 |
| 2007/0156479 A1 | 7/2007 | Long |
| 2008/0021807 A1 | 1/2008 | Danko et al. |
| 2009/0183098 A1 | 7/2009 | Casparian et al. |
| 2010/0060585 A1 | 3/2010 | Chiu |
| 2010/0265182 A1* | 10/2010 | Ball ............ G06F 3/0238 345/168 |
| 2011/0071857 A1 | 3/2011 | Malov et al. |
| 2011/0112866 A1 | 5/2011 | Gerrans |
| 2011/0199308 A1 | 8/2011 | Nativel et al. |
| 2012/0136770 A1 | 5/2012 | Co et al. |
| 2012/0235917 A1 | 9/2012 | Miron |
| 2013/0097548 A1* | 4/2013 | Yang ............ G06F 3/0238 715/773 |

FOREIGN PATENT DOCUMENTS

| | | |
|---|---|---|
| GB | 2313276 | 11/1997 |
| JP | 2003186614 | 7/2003 |
| JP | 2004164517 | 6/2004 |
| JP | 2010061656 | 3/2010 |

OTHER PUBLICATIONS

International Search Report and Written Opinion for PCT/IB2012/051202 dated Nov. 29, 2012, 9 pages.

International Preliminary Report on Patentability for PCT/IB2012/051202, dated Sep. 26, 2013, 6 pages.

Extended Search Report for European Patent Application No. 12756966.3, dated Oct. 22, 2014, 6 pages.

Office Action for U.S. Appl. No. 13/419,596, dated Oct. 15, 2014, 18 pages.

Office Action for U.S. Appl. No. 13/419,596, dated Apr. 1, 2014, 23 pages.

Advisory Action for U.S. Appl. No. 13/419,596, dated Mar. 23, 2015, 3 pages.

Office Action for Chinese Patent Application Serial No. 201280018274.2, dated Nov. 4, 2015, 25 pages (Including 13 pages of English translation.)

Office Action for Japanese Patent Application Serial No. 2013-558553, dated Feb. 9, 2016, 9 pages (Including 5 pages of English translation.)

Office Action for Chinese Patent Application No. 201280018274.2 dated Feb. 28, 2017, 4 pages (Including 1 page of English translation).

Office Action for European Patent Application No. 12756966.3, dated Feb. 7, 2018, 6 pages.

Office Action for Canadian Patent Application No. 2,830,034 dated Dec. 11, 2017, 6 pages.

* cited by examiner

Fig. 3

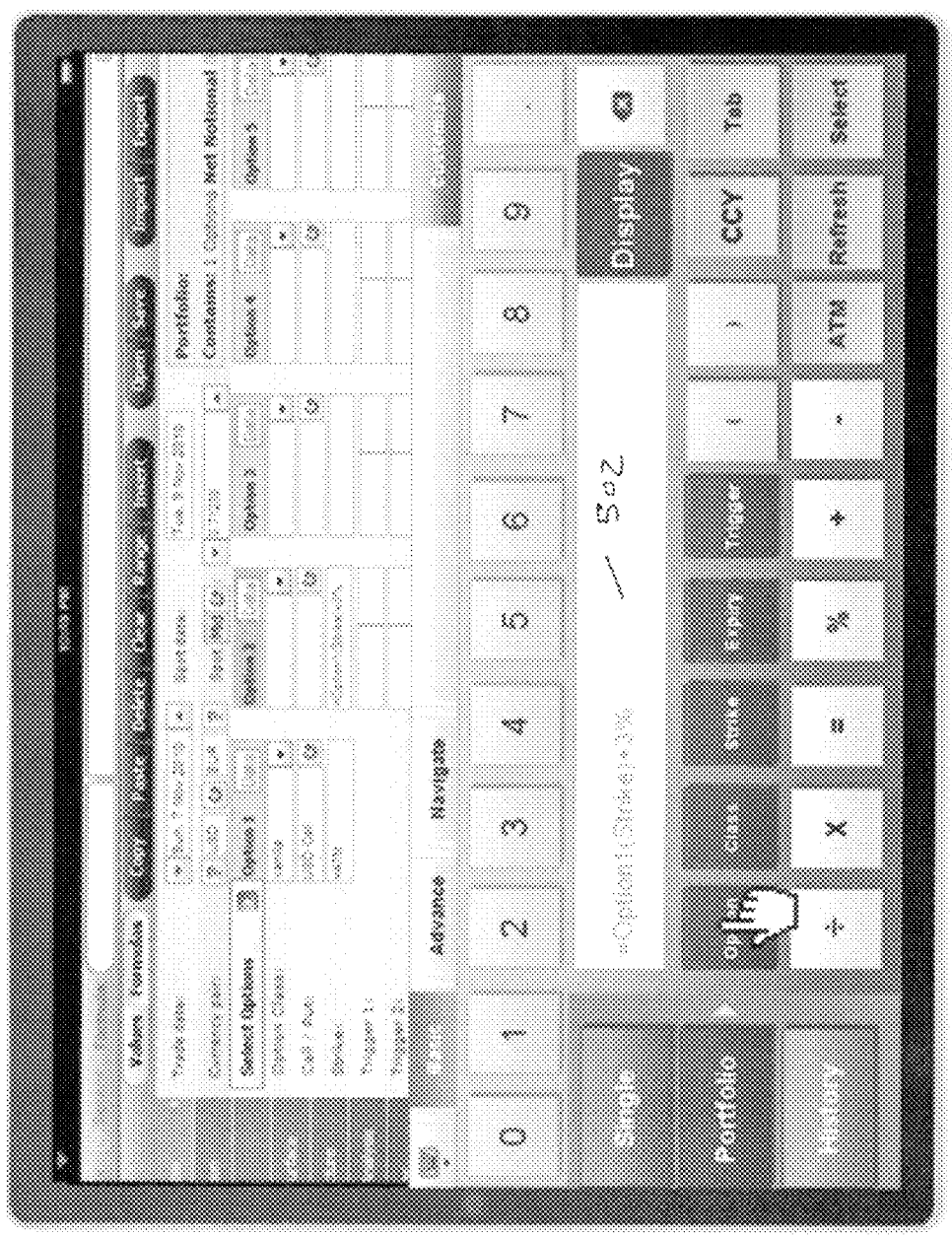

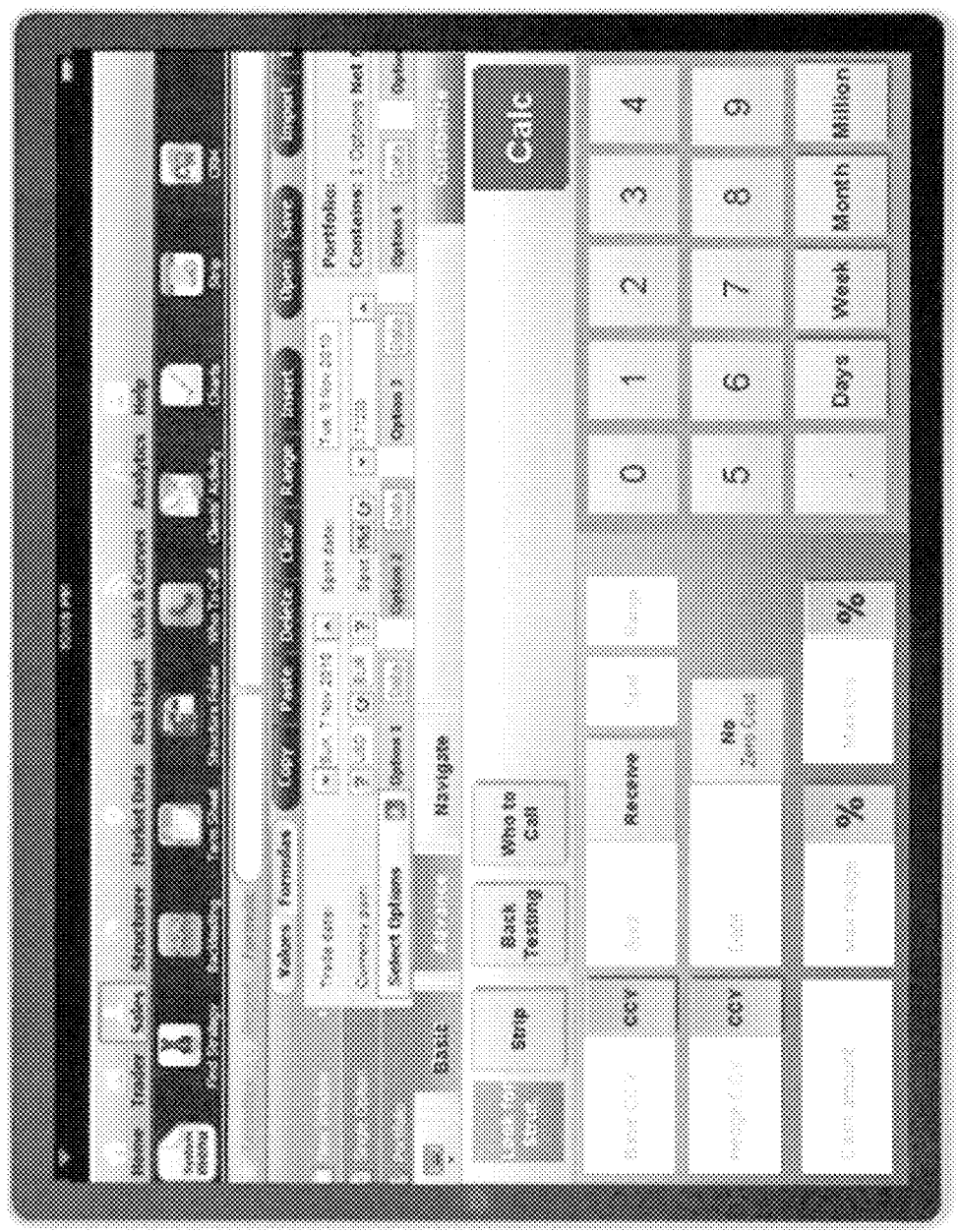

CONTEXT-BASED KEYBOARD

CROSS REFERENCE

This application is a Continuation application of U.S. patent application Ser. No. 13/419,596, filed on Mar. 14, 2012, which claims the benefit of and priority from U.S. Provisional Patent application 61/452,222, entitled "Context-based Keyboard", filed Mar. 14, 2011, the entire disclosures of which are incorporated herein by reference.

FIELD

The disclosure relates generally to keyboards and, more specifically, to virtual keyboards, which are customized based on an input context, e.g., an input context for defining a financial instrument.

BACKGROUND

A keyboard includes an arrangement of physical or virtual buttons or keys configured to receive input from a user of a computing device.

Each key of the keyboard typically represents a single written symbol or character. Some symbols may be produced in response to a user pressing and holding several keys simultaneously or in sequence. While most keyboard keys produce letters, numbers, signs or characters, other keys or simultaneous key presses can produce actions or computer commands.

The keyboard may be used to enter commands on a command-line interface or a command syntax, and/or to type text and numbers into a word processor, text editor or other program.

A virtual keyboard (also known as a software keyboard or an on-screen keyboard) may be generated by a computer program that displays an image of a keyboard including a plurality of virtual keys on a screen. Another input device, such as a mouse or a touch screen may be used to operate each virtual key of the virtual keyboard.

Other graphical and/or virtual user interfaces may be used for receiving input from the user of the computing device. For example, a drop-down list is a user interface control graphical user interface (GUI) element ("widget"), similar to a list box, which allows the user to choose one value from a list. When a drop-down list is inactive, the drop-down list displays a single value. When activated, the drop-down list displays (drops down) a list of values, from which the user may select one. When the user selects a new value, the drop-down list reverts to its inactive state, displaying the selected value.

Virtual keyboards and/or interfaces have become very popular in touch screen enabled devices, for example, touch screen enabled cell phones, tablet computers and the like, due to the additional cost and space requirements of other types of hardware keyboards. Some operating systems include on-screen keyboards and/or interfaces that can be controlled with the mouse.

Relatively complex interfaces, e.g., interfaces configured for receiving a large amount of data, may be by computer applications in various fields, for example, in the field of financial instruments.

Pricing financial instruments is a complex art requiring substantial expertise and experience. Trading financial instruments, such as options, involves a sophisticated process of pricing typically performed by a trader.

The term "option" in the context of the present application is broadly defined as any financial instrument having option-like properties, e.g., any financial derivative including an option or an option-like component. This category of financial instruments may include any type of option or option-like financial instrument, relating to some underlying asset. Assets as used in this application include anything of value; tangible or non-tangible, financial or non-financial, for example, stocks; currencies; commodities, e.g., oil, metals, or sugar; weather, e.g. the temperature at a certain area; electricity; gas emission; interest rates; forward-rate agreements (FRA); swaps; futures; bonds; credit; mortgages; indices; and the like. For example, as used herein, options range from a simple Vanilla option on a single stock and up to complex convertible bonds whose convertibility depends on some key, e.g., the weather.

The term "Exchange" in the context of the present application relates to any one or more exchanges throughout the world, and includes all assets/securities, which may be traded in these exchanges. The terms "submit a price to the exchange", "submit a quote to the exchange", and the like generally refer to actions that a trader may perform to submit a bid and/or offer prices for trading in the exchange. The price may be transferred from the trader to the exchange, for example, by a broker, by online trading, on a special communication network, through a clearing house system, and/or using in any other desired system and/or method.

The price of an asset for immediate, e.g., 1 or 2 business days, delivery is called the spot price. For an asset sold in an option contract, the strike price is the agreed upon price at which the deal is executed if the option is exercised. For example, a stock option involves buying or selling a stock. The spot price is the current stock price on the exchange in which is the stock is traded. The strike price is the agreed upon price to buy/sell the stock if the option is exercised.

To facilitate trading of options and other financial instruments, a market maker suggests a bid price and offer price (also called ask price) for a certain option. The bid price is the price at which the market maker is willing to purchase the option and the offer price is the price at which the market maker is willing to sell the option. As a market practice, a first trader interested in a certain option may ask a second trader for a quote, e.g., without indicating whether the first trader is interested to buy or to sell the option. The second trader quotes both the bid and offer prices, not knowing whether the first trader is interested in selling or buying the option. The market maker may earn a margin by buying options at a first price and selling them at a second price, e.g., higher than the first price. The difference between the offer and bid prices is referred to as bid-offer spread.

A call option is the right to buy an asset at a certain price ("the strike") at a certain time, e.g., on a certain date. A put option is the right to sell an asset at a strike price at a certain time, e.g., on a certain date. Every option has an expiration time in which the option ceases to exist. Prior to the option expiration time, the holder of the option may determine whether or not to exercise the option, depending on the prevailing spot price for the underlying asset. If the spot price at expiration is lower than the strike price, the holder will choose not to exercise the call option and lose only the cost of the option itself. However, if the strike is lower than the spot, the holder of the call option will exercise the right to buy the underlying asset at the strike price making a profit equal to the difference between the spot and the strike prices. The cost of the option is also referred to as the premium.

A forward rate is defined as the predetermined rate or price of an asset, at which an agreed upon future transaction will take place. The forward rate may be calculated based on a current rate of the asset, a current interest rate prevailing in the market, expected dividends (for stocks), cost of carry (for commodities), and/or other parameters depending on the underlying asset of the option.

An at-the-money forward option (ATM) is an option whose strike is equal to the forward rate of the asset. In some fields, the at-the-money forward options are generically referred to as at-the-money options, as is the common terminology in the commodities and interest rates options. The at the money equity options are actually the at the money spot, i.e. where the strike is the current spot rate or price.

An in-the-money call option is a call option whose strike is below the forward rate of the underlying asset, and an in the-money put option is a put option whose strike is above the forward rate of the underlying asset. An out-of-the-money call option is a call option whose strike is above the forward rate of the underlying asset, and an out-of-the-money put option is a put option whose strike is below the forward rate of the underlying asset.

An exotic option, in the context of this application, is a generic name referring to any type of option other than a standard Vanilla option. While certain types of exotic options have been extensively and frequently traded over the years, and are still traded today, other types of exotic options had been used in the past but are no longer in use today. Currently, the most common exotic options include "barrier" options, "digital" options, "binary" options, "partial barrier" options (also known as "window" options), "average" options, "compound" options and "quanto" options. Some exotic options can be described as a complex version of the standard (Vanilla) option. For example, barrier options are exotic options where the payoff depends on whether the underlying asset's price reaches a certain level, hereinafter referred to as "trigger", during a certain period of time. The "pay off" of an option is defined as the cash realized by the holder of the option upon its expiration. There are generally two types of barrier options, namely, a knock-out option and a knock-in option. A knock-out option is an option that terminates if and when the spot reaches the trigger. A knock-in option comes into existence only when the underlying asset's price reaches the trigger. It is noted that the combined effect of a knock-out option with strike K and trigger B and a knock-in option with strike K and trigger B, both having the same expiration, is equivalent to a corresponding Vanilla option with strike K. Thus, knock-in options can be priced by pricing corresponding knock-out and vanilla options. Similarly, a one-touch option can be decomposed into two knock-in call options and two knock-in put options, a double no-touch option can be decomposed into two double knock-out options, and so on. It is appreciated that there are many other types of exotic options known in the art.

Certain types of options, e.g., Vanilla options, are commonly categorized as either European or American. A European option can be exercised only upon its expiration. An American option can be exercised at any time after purchase and before expiration. For example, an American Vanilla option has all the properties of the Vanilla option type described above, with the additional property that the owner can exercise the option at any time up to and including the option's expiration date. As is known in the art, the right to exercise an American option prior to expiration makes American options more expensive than corresponding European options.

Generally in this application, the term "Vanilla" refers to a European style Vanilla option. European Vanilla options are the most commonly traded options; they are typically traded over the counter (OTC). American Vanilla options are more popular in the exchanges and, in general, are more difficult to price.

SUMMARY

Some references include methods, devices and systems of context-based keyboards.

In some demonstrative embodiments, a system may include a memory having stored thereon instructions; and a processor to execute the instructions resulting in a virtual keyboard application to interface between a user and at least one financial-instrument application.

In some demonstrative embodiments, the virtual keyboard application may be customized based on an input context to be provided from the user to the financial instrument application. The input context may include a predefined combination of a plurality of context components defining a financial instrument, the plurality of context components including input elements selected from a respective plurality of predefined sets of input elements, such that a context component has an input element selected from a set of input elements corresponding to the context component, In some demonstrative embodiments, the virtual keyboard application may present to the user a plurality of keyboard elements representing all input elements of the plurality of sets of input elements. For example, each keyboard element may represent a different input element.

In some demonstrative embodiments, the virtual keyboard application may receive from the user an indication of a sequence of keyboard elements selected from the plurality of keyboard elements. The virtual keyboard application may provide to the application an input string including a sequence of input elements selected from the sets of input elements according to the sequence of keyboard elements.

In some demonstrative embodiments, the system may include a suitable memory to store the plurality of sets of input elements. The virtual keyboard application may read and select a particular input element from the memory according to the selected keyboard elements.

In some demonstrative embodiments, the plurality of context components include at least one of a type of the financial instrument, a currency type, a time period, a currency pair, an expiration date, an interest rate, and a notional amount.

In some demonstrative embodiments, the plurality of sets of input elements include at least one of a first set of input elements representing a plurality of types of the financial instrument, a second set of input elements representing a plurality of currency types, a third set of input elements representing a plurality of time periods, a fourth set of input elements representing a plurality of currency pairs, a fifth set of input elements representing a plurality of expiration dates, a sixth set of input elements representing a plurality of interest rate types, and a seventh set of input elements representing a plurality of notional amounts.

In some demonstrative embodiments, the keyboard elements include keyboard elements representing each input element of at least one of the first, second, third, fourth, fifth, sixth and seventh sets of input elements.

In some demonstrative embodiments, the keyboard elements include at least one reference keyboard element to enable the user to select a reference financial instrument, with respect to which the context components of the input context are to be defined.

In some demonstrative embodiments, the keyboard elements include at least one expandable keyboard elements representing a set of keyboard elements. For example, upon the user selecting the expandable keyboard elements, the keyboard application may switch to present the set of keyboard elements.

In some demonstrative embodiments, the expandable keyboard element represents a particular context component. For example, the set of keyboard elements represent a set of input elements corresponding to the particular context component.

In some demonstrative embodiments, the keyboard application may dynamically update the keyboard elements based on input from the user.

In some demonstrative embodiments, the keyboard application may update the keyboard elements based on a frequency of use of the keyboard elements by the user.

In some demonstrative embodiments, the keyboard application may provide the user with a list of at least some of the input elements of the plurality of sets of input elements. The keyboard application may receive from the user an indication of one or more selected input elements. The keyboard application may update the keyboard elements to include one or more keyboard elements representing the one or more selected input elements.

In some demonstrative embodiments, the input context includes a combination of N>1 context components, denoted $X_1 \ldots X_N$, an i-th context component, denoted $X_i$, wherein $i=1 \ldots N$, including an input element selected from a predefined set of $M_i>1$ input elements, denoted $\{X_{i1}, X_{i2}, \ldots, X_{iMi}\}$. For example, the keyboard elements may include keyboard elements representing each of the input elements $\{X_{i1}, X_{i2}, \ldots, X_{iMi}\}$ of all N context components.

In some demonstrative embodiments, the input context may include a single input syntax, a single command line, or a single input line.

In some demonstrative embodiments, the keyboard application may present to the user a graphical keyboard including the keyboard elements.

Some demonstrative embodiments include a computer-based method including presenting, by a computing device, to a user of the computing device a virtual context-based keyboard, which is customized based on an input context to be provided from the user to at least one application. The input context may include a predefined combination of a plurality of context components including input elements selected from a respective plurality of predefined sets of input elements, such that a context component has an input element selected from a set of input elements corresponding to the context component.

In some demonstrative embodiments, the virtual keyboard may include a plurality of keyboard elements representing all input elements of the plurality of sets of input elements, each keyboard element representing a different input element.

Some demonstrative embodiments include a machine-readable medium having stored thereon instructions, which when executed by a machine result in presenting to a user of a computing device a virtual context-based keyboard, which is customized based on an input context to be provided from the user to at least one application. The input context may include a predefined combination of a plurality of context components including input elements selected from a respective plurality of predefined sets of input elements, such that a context component has an input element selected from a set of input elements corresponding to the context component. The virtual keyboard may include a plurality of keyboard elements representing all input elements of the plurality of sets of input elements, each keyboard element representing a different input element.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a screenshot illustration of a context-customized keyboard, which is customized for a second input context, in accordance with some demonstrative embodiments.

FIGS. 4-7 are screenshot illustrations of input contexts entered by four respective context-customized keyboards, in accordance with some demonstrative embodiments.

DETAILED DESCRIPTION

Figure 1:
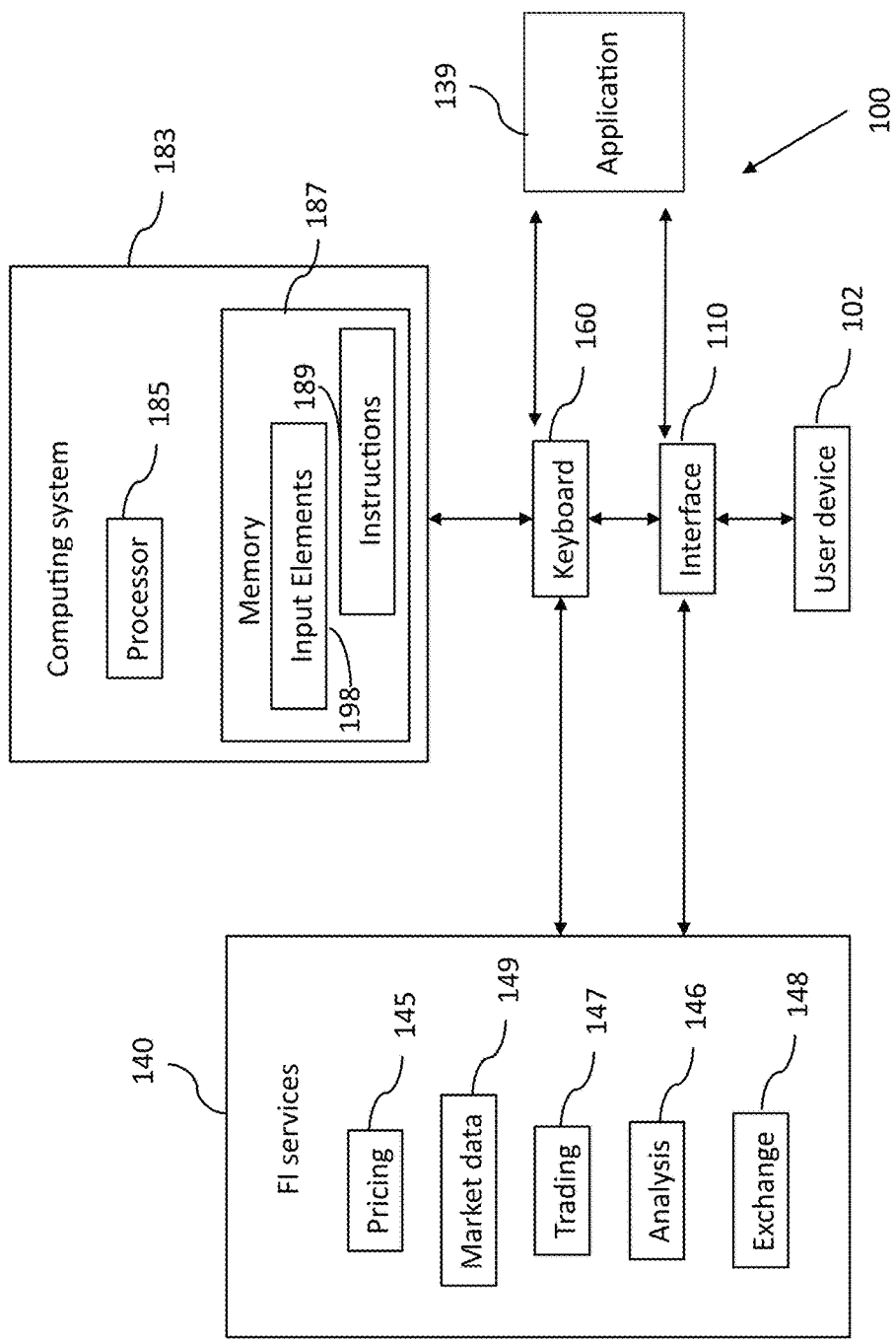
FIG. 1 is a schematic illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a cellular telephone, a wireless telephone, a Personal Communication Systems (PCS) device, a PDA device which incorporates a wireless communication device, a device having one or more internal antennas and/or external antennas, a wired or wireless handheld device (e.g., BlackBerry, Palm Treo), a Wireless Application Protocol (WAP) device, or the like.

Some demonstrative embodiments include a context-based virtual keyboard, which is customized based on an input context to be inputted via the virtual keyboard, as described in detail below.

Some computer-based applications may be configured to receive from a user a context ("input context"), which includes a plurality of fields, values, parameters, definitions, items and/or any other suitable input components ("context components"). The input context may be received, for example, via a suitable input syntax, command line, input line, and the like.

In some demonstrative embodiments, the input context may include a predefined combination of a plurality of context components, wherein a context component may have an input element selected from a predefined plurality of input elements.

In some demonstrative embodiments, e.g., as described below, the input context may correspond to a financial instrument, for example, the input context may include an input context defining a financial instrument, e.g., a Foreign Exchange (FX) or Exchange-rate (ER) option, options on Interest Rate (IR) futures and/or options on commodities and/or any other suitable financial instruments and/or markets. One skilled in the art may apply the embodiments to other options and/or option-like financial instruments, e.g., any suitable options on any suitable asset instruments and/or options on non-asset instruments, such as options on the weather and/or the temperature, and the like, with variation as may be necessary to adapt for factors unique to a given financial instrument.

The phrase "financial instrument" (also referred to as "trade structure", "trade", "deal" or "trade strategy") may refer to any one or more suitable derivative instruments, e.g., forwards, swaps, futures, exchange options, OTC options, and the like, which derive their value from the value and characteristics of one or more underlying assets of any suitable "asset class", e.g., FX, Interest Rate, Equity, Commodities, Credit, weather, energy, real estate, mortgages, and the like; and/or may involve more than one asset class, e.g., cross-asset, multi asset, and the like. The phrase "financial instrument" may also refer to any suitable combination of one or more financial instruments.

The phrase "defining a financial instrument" may refer to setting, determining, establishing and/or defining a plurality of parameters ("financial instrument parameters"), which construct, create, build and/or define a financial instrument, for example, in a manner, which may enable trading, pricing, handling, and/or processing the financial instrument.

It should be appreciated, that other embodiments may include or be implemented with respect to any other suitable input context. In one example, the input context may include an input context for defining any suitable item, asset, product, service, command, criterion, and/or operation according to an input from a user. In one example, the input context may include a plurality of context components defining a search criterion, which includes a combination of a predefined set of criterion parameters. For example, the context input may define a search criterion for searching a product, service or asset, e.g., a real estate asset.

For example, the context input may include a plurality of context components defining attributes of a real-estate asset. For example, a first context component may include a context component selected from a predefined plurality of input elements defining a type of the real-estate asset, e.g., an apartment, a building, a cottage, and the like; a second context component may include a context component selected from a predefined plurality of input elements defining a transaction of the real-estate asset, e.g., sale, rent, and the like; a third context component may include a context component selected from a predefined plurality of input elements defining a general location of the real-estate asset, e.g., a plurality of cities; a fourth context component may include a context component selected from a predefined plurality of input elements defining a specific location of the real-estate asset, e.g., a plurality of streets; and the like.

In some demonstrative embodiments, a user may be required to define a financial instrument, for example, in order to price the financial instrument, analyze the financial instrument, trade the financial instrument, convey the financial instrument to another user and/or entity, process the financial instrument and/or handle the financial instrument in any other suitable manner. For example, when traders want to perform a trade they must convey to their counterparty the type of trade they want to perform. Given the trade type there is a list of context components, e.g., in the form of field names and values, which need to be specified. In one example, for a deal of type "vanilla call option" a user may have to specify the following context components:

Deal type=Vanilla
Call=USD
Put=JPY
Strike=85
Expiry=3 Months
Notional=1 Million

It is noted that deals of higher complexity may have additional and/or alternative context components.

Some devices, for example, touch screen enabled devices, e.g., smartphones, touch screen enabled cell phones, tablet computers, personal-digital-assistants, and the like, may implement virtual keyboards and/or interfaces, e.g., due to the additional cost and space requirements of hardware keyboards.

Using a conventional keyboard layout for specifying the input parameters defining the financial instrument may require "wasting" a large area of the screen for graphically presenting the entire conventional keyboard layout. In addition, the user may invest efforts and time to "type" in text representing each of the input parameters.

An interface including a drop-down list for presenting the different input elements with respect to each of the input parameters defining the financial instrument may be inconvenient for the user, for example, if the user is required to scroll through a drop-down list, which includes a relatively large number of options and/or if a relatively large number of drop-down lists are presented to the user.

Some demonstrative embodiments, include a context-customized virtual keyboard, and/or methods, devices and/or systems of defining, generating and/or utilizing the context-customized virtual keyboard, e.g., as described below.

In some demonstrative embodiments, the context-customized virtual keyboard may be customized to receive from a user an input context having a combination of a predefined plurality of context components, wherein a context component is selected from a predefined plurality of input elements.

For example, the input context may include an input line or command line, e.g., in the form of an input text line, for defining a financial instrument. The context components may include the components required for defining the financial instrument and the input elements include the different available inputs for the context components. For example, a first context component may include a type of the financial instrument, and the input elements of this context component may include "Vanilla", "RR", and the like. A second context component may include a currency type, and the input elements of this context component may include US Dollar ("USD"), Euro ("EUR"), Japanese Yen ("JPY"), and the like. A third context component may include a time period, and the input elements of this context component may include "year", "day", "month", "one year", "three months" and the like.

In some demonstrative embodiments, the context-customized virtual keyboard may include a graphical keyboard including a plurality of graphical keyboard elements representing the plurality of input elements, e.g., as described below with reference to FIGS. 2-7.

In some demonstrative embodiments, the input context may be entered by the user via the graphical keyboard elements, e.g., using a touch screen, a mouse and/or any other input device.

Reference is now made to FIG. 1, which schematically illustrates a block diagram of a system 100, in accordance with some demonstrative embodiments.

In some demonstrative embodiments, system 100 may include a context-customized keyboard 160, which is customized according to an input context to be received from a user of an application 139, e.g., as described below.

In some demonstrative embodiments, system 100 includes one or more user stations or devices 102, for example, a Smartphone, a cell phone, a tablet computer, PC, a laptop computer, a PDA device, and/or a terminal, to allow one or more users to provide the input context to application 139 using context-customized keyboard 160, e.g., as described below.

In some demonstrative embodiments, devices 102 may be implemented using suitable hardware components and/or software components, for example, processors, controllers, memory units, storage units, input units, output units, communication units, operating systems, applications, or the like.

In some demonstrative embodiments, context-customized keyboard 160 may be implemented as part of an interface 110 to interface between users 102 and one or more elements of system 100, e.g., application 139.

In some demonstrative embodiments, context-customized keyboard 160 and/or interface 110 may include a local or remote application executed by any suitable computing system 183. For example, computing system 183 may include a suitable memory 187 having stored-thereon application instructions 189, and a suitable processor 185 to execute instructions 189 resulting in context-customized keyboard 160 and/or interface 110.

In some demonstrative embodiments, computing system 183 may include or may be part of a server to provide the functionality of context-customized keyboard 160 and/or interface 110 to users 102. In other embodiments, computing system 183 may be implemented as part of user station 102. For example, instructions 189 may be downloaded and/or received by users 102 from another computing system, such that context-customized keyboard 160 and/or interface 110 may be locally executed by users 102. For example, instructions 189 may be received and stored, e.g., temporarily, in a memory or any suitable short-term memory or buffer of user device 102, e.g., prior to being executed by a processor of user device 102. In other embodiments, computing system 100 may include any other suitable computing arrangement, server and/or scheme.

In some demonstrative embodiments, context-customized keyboard 160 and/or interface 110 may be associated with and/or included as part of devices 102. In one example, context-customized keyboard 160 and/or interface 110 may be implemented, for example, as middleware, as part of any suitable application, and/or as part of a server. In some demonstrative embodiments, context-customized keyboard 160 and/or interface 110 may include, or may be part of a Web-based application, a web-site, a web-page, a stand-alone application, a plug-in, an ActiveX control, a rich content component (e.g., a Flash or Shockwave component), or the like.

In some demonstrative embodiments, context-customized keyboard 160 and/or interface 110 may include or may be associated with a suitable Graphical User Interface (GUI).

In some demonstrative embodiments, device 102 may include a suitable input unit 119 to receive from the user of device 102 input to be provided to context-customized keyboard 160. In some embodiments, input 119 may include, or be implemented as part of, a suitable touch screen, for example, such that the user of device 102 may select one or more keys of context-customized keyboard 160 by touching a screen of device 102. In other embodiments, input 119 may include, or be implemented as part of, any suitable selection module, for example, a mouse, configured to allow the user of device 102 to select one or more keys of context-customized keyboard 160.

In some demonstrative embodiments, system 100 may be capable of handling and/or processing information related to a financial instrument. For example, application 139 may include a suitable financial instrument application be capable of performing one or more suitable operations with respect to a suitable financial instrument on any a suitable underlying asset, e.g. currencies, interest rates, commodities, equity, energy, credit, weather, and the like. According to this example, keyboard 160 may be configured to allow the user of device 102 to define one or more financial instruments to be processed by application 139. The user of device 102 may include, for example, a trader, a business analyst, a corporate structuring manager, a salesperson, a risk manager, a front office manager, a back office, a middle office, a system administrator, and the like.

In some demonstrative embodiments, application 139 may be implemented as part of one or more Financial-Instrument (FI) systems and/or services 140 and/or keyboard 160 and/or interface 110 may optionally interface between users 102 and services 140. Services 140 may include, for example, a suitable pricing module 145 capable of pricing one or more financial instruments according to any suitable pricing method and/or algorithm, one or more market data services 149, one or more trading systems 147, one or more exchange connectivity systems 148, one or more analysis services 146 and/or one or more other suitable FI-related services, systems and/or platforms.

In some demonstrative embodiments, keyboard 160 and/or interface 110 may be implemented as part of FI systems/services 140, e.g., as part of, or in association with, pricing module 145, as part of device 102 and/or as part of any other suitable system or module, e.g., as part of any suitable server, or as a dedicated server.

In some demonstrative embodiments, computing system 183 may also execute one or more of FI systems/services 140. In other embodiments, keyboard 160 and/or interface 110 may be implemented separately from one or more of FI systems/services 140.

In some demonstrative embodiments, keyboard 160 may be configured to allow users 102 to enter a user input, e.g., a single line or single syntax input or any other suitable input, line and/or syntax, including an input context for defining a financial instrument; to define and/or structure a trade corresponding to the financial instrument; to transact the trade; and/or to perform any other suitable operation. For example, keyboard 160 may include, may be included as part of, or may be associated with a suitable GUI.

In some demonstrative embodiments, application 139 may be configured to receive from the user of device 102 an input context, which includes a plurality of context components. The input context may be received, for example, via a suitable input syntax, command line, input line, and the like.

In some demonstrative embodiments, the input context may include a predefined combination of a plurality of context components, wherein a context component may have an input element selected from a predefined plurality of input elements.

In some demonstrative embodiments, the input context may include a combination of N>1 context components, denoted $X_1 \ldots X_N$. An i-th context component, denoted $X_i$, wherein i=1 . . . N, may include an input element selected from a predefined set of $M_i$>1 input elements, denoted $\{X_{i1}, X_{i2}, \ldots, X_{iM_i}\}$. In one example, the input context may include a combination of N=6 context components, denoted $X_1, X_2, X_3, X_4, X_5, X_6$. According to this example, $X_1$ may be selected from a set of $M_1$=3 input elements $\{X_{11}, X_{12}, X_{13}\}$; $X_2$ may be selected from a set of $M_2$=5 input elements $\{X_{21}, X_{22}, X_{23}, X_{24}, X_{25}\}$; $X_3$ may be selected from a set of $M_3$=4 input elements $\{X_{31}, X_{32}, X_{33}, X_{34}\}$; $X_4$ may be selected from a set of $M_4$=3 input elements $\{X_{41}, X_{42}, X_{43}\}$; and $X_5$ may be selected from a set of $M_5$=2 input elements $\{X_{51}, X_{52}\}$. In other embodiments, N and/or $M_i$ may have any other suitable values and/or the context input may include any other suitable combination of context components.

In some demonstrative embodiments, the input context may correspond to a financial instrument, for example, the input context may include an input context defining a financial instrument, e.g., a Foreign Exchange (FX) or Exchange-rate (ER) option, options on Interest Rate (IR) futures and/or options on commodities and/or any other suitable financial instruments and/or markets.

In one example, the input context may include a predefined combination of a plurality of context components, e.g., defining a financial instrument, the plurality of context components including input elements selected from a respective plurality of predefined sets of input elements, such that a context component has an input element selected from a set of input elements corresponding to the context component, e.g., as described in detail below.

In other embodiments, the input context may correspond to any other suitable item, asset, product, service, command, criterion, and/or operation, and the like.

In some demonstrative embodiments, the user of device 102 may be required to define a financial instrument, for example, in order to price the financial instrument, analyze the financial instrument, trade the financial instrument, convey the financial instrument to another user and/or entity, process the financial instrument and/or handle the financial instrument in any other suitable manner. The user may define the financial instrument using a combination of a plurality of context components, e.g., as described above.

In some demonstrative embodiments, context-customized keyboard 160 may be customized to receive from the user of device 102 the input context. For example, the input context may include an input line or command line, e.g., in the form of an input text line, for defining the financial instrument. The context components may include the components required for defining the financial instrument and the input elements may include the different available inputs for the context components. For example, a first context component may include a type of the financial instrument, and the input elements of this context component may include "Vanilla", "RR", and the like. A second context component may include a currency type, and the input elements of this context component may include "USD", "EUR", "JPY", and the like. A third context component may include a time period, and the input elements of this context component may include "year", "day", "month", "one year", three months", and the like.

In some demonstrative embodiments, context-customized keyboard 160 may include a graphical keyboard including a plurality of graphical keyboard elements representing the plurality of input elements, e.g., as described below.

In one example, context-customized keyboard 169 may present to the user of device 102 a virtual context-customized keyboard including a plurality of keyboard elements representing input elements, e.g., all input elements, of the plurality of sets of input elements, each keyboard element representing a different input element, e.g., as described below.

In some demonstrative embodiments, keyboard 160 may generate a representation of the input context based on the keyboard elements selected by the user of device 102. For example, keyboard 160 may provide a command line including a string, e.g., a text string, which includes the input context corresponding to the keyboard elements selected by the user of device 102. The input context may then be provided to application 139.

In one example, keyboard application 160 may receive from the user of device 102 an indication of a sequence of keyboard elements selected from the plurality of keyboard elements, and to provide to an application an input string including a sequence of input elements selected from the sets of input elements according to the sequence of keyboard elements.

In some demonstrative embodiments, at least one keyboard element of keyboard 160 may represent a plurality of input elements of a common context component and/or a plurality of input elements of a plurality of context components. For example, keyboard 160 may include a plurality of numerical keyboard elements, for example, ten keyboard elements representing the numerals 0-10, respectively, e.g., as described below. The numerical keyboard elements may be used by the user of device 102 to define an expiration component of a financial instrument, a strike component of the financial instrument and/or a notional amount of the financial instrument.

In some demonstrative embodiments, system 100 may include a memory, storage and/or database to store a plurality of sets of input elements 198 corresponding to the context components of the input context, e.g., in the form of a list, table and the like. For example, memory 187 may store the plurality of sets of input elements corresponding to the context components of the input context to be provided to application 139. Keyboard application 160 may read and select a particular input element from memory 183 according to the selected keyboard elements.

For example, keyboard 160 may present to the user of device a plurality of graphical keyboard elements including keyboard elements representing the type of the financial instrument, e.g., keyboard elements "Vanilla", "RR", and the like; keyboard elements representing the currency type, e.g., keyboard elements "USD", "EUR", "JPY", and the like; keyboard elements representing the time period, e.g., keyboard elements "year", "day", "month", "one year", three months", and the like, e.g., as described below. According to this example, memory 187 may store input elements of the context component representing the type of the financial instrument, e.g., a list of the input elements "Vanilla", "RR", and the like; input elements of the context component representing the currency type, e.g., a list of the input elements "USD", "EUR", "JPY", and the like; input elements of the context component representing the time period, e.g., a list of the input elements "year", "day", "month", "one year", three months", and the like. According to this example, upon the user of device 102 selecting a keyboard element representing one of the input elements, keyboard application 160 may read and select from memory 187 the input element corresponding to the selected keyboard element. For example, upon the user selecting the keyboard element "Vanilla", keyboard application 160 may read and select from memory 187 the input element "Vanilla".

In some demonstrative embodiments, the user of device 102 may select a sequence of keyboard elements representing a sequence of input elements, and keyboard application 160 may select and read from memory 187 the input elements corresponding to the sequence of selected keyboard elements, and may generate an input context based on the input elements, which were read from memory 187, e.g., as described below.

Figure 2:
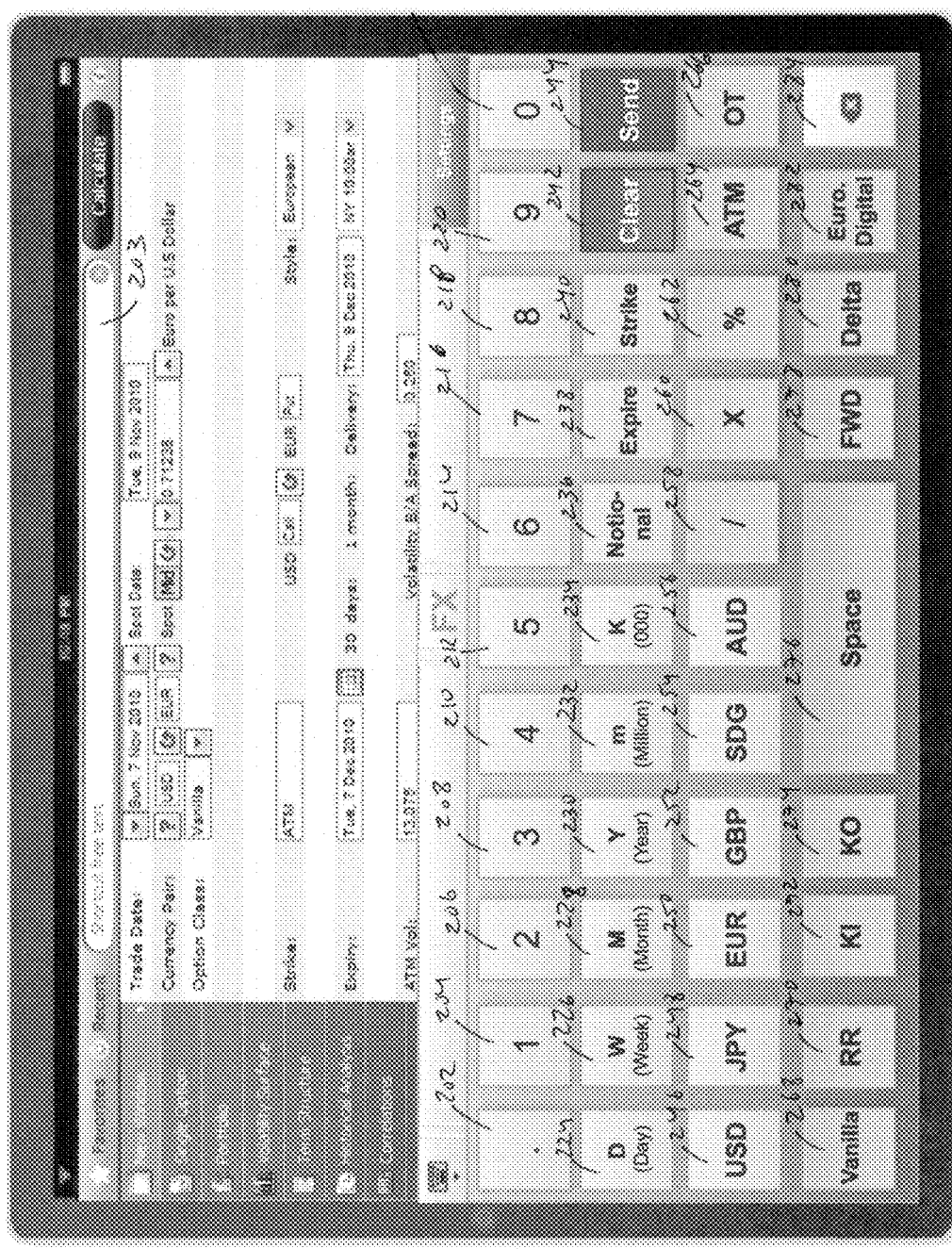
FIG. 2 is a screenshot illustration of a context-customized keyboard, which is customized for a first input context, in accordance with some demonstrative embodiments.

Reference is now made to FIG. 2, which schematically illustrates a context-customized keyboard 200, which is customized for a first input context, in accordance with some demonstrative embodiments. In some demonstrative embodiments, keyboard 200 may perform the functionality of keyboard 160 (FIG. 1)

In some demonstrative embodiments, keyboard 200 may be customized for receiving an input context relating to a foreign exchange (FX) financial instrument.

In some demonstrative embodiments, the input context for defining an FX financial instrument may include a class component to define the class of the option, a currency pair component to define the currency pair, an expiration component to define an expiration date of the financial instrument, a notional component to define a notional amount of the financial instrument, an/or any other suitable component.

As shown in FIG. 2, keyboard 200 may include a plurality of keyboard elements representing a plurality of input elements corresponding to the class component. For example, keyboard 200 may include keyboard elements 268, 270, 272, 274 and 282 representing the classes Vanilla, RR, Knock-in (KI), Knock-out (KO) and Euro-Digital, respectively.

As shown in FIG. 2, keyboard 200 may include a plurality of keyboard elements representing a plurality of input elements corresponding to a plurality of currencies. For example, keyboard 200 may include keyboard elements 246, 248, 250, 252, 254 and 256 representing the currencies US dollar (USD), Japanese Yen (JPY), Euro (EUR), British Pound (GBP), Singapore dollar (SDG), and Australian dollar (AUD), respectively.

As shown in FIG. 2, keyboard 200 may include a plurality of multiplier keyboard elements representing a plurality of predefined multiplier values. For example, keyboard 200 may include keyboard elements 232 and 234 representing the multiplier values of one million and one thousand, respectively.

As shown in FIG. 2, keyboard 200 may include a plurality of period-related keyboard elements representing a plurality of time periods. For example, keyboard 200 may include keyboard elements 224, 226, 228 and 230 representing the time periods of a day, a week, a month and a year, respectively.

As shown in FIG. 2, keyboard 200 may include a plurality of numerical keyboard elements 202, 204, 206, 208, 210, 212, 214, 216, 218, 220 and 222 representing the decimal point and the numerals 0-10. Keyboard 200 may also include operator keyboard elements 258, 260 and 262 representing mathematical operators. Keyboard 200 may also include a "space" keyboard element 276 representing a textual space and/or a "backspace" keyboard element 284 representing a textual backspace.

As shown in FIG. 2, keyboard 200 may include one or more keyboard elements for defining input elements of one or more context components in combination with one or more of the other keyboard elements, e.g., one or more of the numerical keyboard elements, the period-related keyboard elements, the multiplier keyboard elements and/or the operator keyboard elements.

For example, keyboard 200 may include a notional keyboard element 236 to define a notional amount of the financial instrument. For example, the user may define the notional amount of the financial instrument by selecting notional keyboard element 236 followed by selecting one or more of keyboard elements 202, 204, 206, 208, 210, 212, 214, 216, 218, 220, 222, 232 and 234. In one example, the user may define a notional amount of 10 million, for example, by sequentially selecting keyboard elements 236, 204, 222 and 232.

Keyboard 200 may include, for example, an expiration keyboard element 238 to define an expiration date of the financial instrument. For example, the user may define the expiration date of the financial instrument by selecting expiration keyboard element 238 followed by selecting one or more of keyboard elements 202, 204, 206, 208, 210, 212, 214, 216, 218, 220, 222, 224, 226, 228 and 230. In one example, the user may define an expiration date of 2 years from a current date, for example, by sequentially selecting keyboard elements 238, 206 and 230.

Keyboard 200 may include, for example, a strike keyboard element 240, a delta keyboard element 280, an at the money (ATM) keyboard element 264 and/or a out-of-the-money (OT) keyboard element 266 to define a strike price of the financial instrument. For example, the user may define the strike price of the financial instrument by selecting keyboard element 264, or selecting strike keyboard element 240 or 280 followed by selecting one or more of keyboard elements 202, 204, 206, 208, 210, 212, 214, 216, 218, 220, 222, and 262. In one example, the user may define an ATM strike, for example, by selecting keyboard element 264. In another example, the user may define the strike price to be 10% out of the money with respect to a price of an underlying asset of the financial asset, for example, by sequentially selecting keyboard elements 240, 266, 204, 222 and 262. In another example, the user may define a strike price of 20 Delta, for example, by sequentially selecting keyboard elements 206, 222 and 280.

Keyboard 200 may include, for example, a forward rate (FWD) keyboard element 278 to define a forward rate corresponding to the financial instrument. For example, the user may define the forward rate corresponding to the financial instrument by selecting keyboard element 278 followed by selecting one or more of keyboard elements 202, 204, 206, 208, 210, 212, 214, 216, 218, 220, 222, and 262. In one example, the user may define the forward rate to be 110% of a price of an underlying asset of the financial asset, for example, by sequentially selecting keyboard elements 278, 204, 204, 222 and 262.

Keyboard 200 may include a "clear" keyboard element 242 to receive from the user a command to delete the input context previously defined by the user.

Keyboard 200 may include a "send" keyboard element 244 to receive from the user a command to enter the input context defined by the user, e.g., to transfer the input context to application 139 (FIG. 1). For example, the user may select keyboard element, e.g., after the user uses the keyboard elements of keyboard 200 to enter the context components defining the financial instrument, and keyboard 200 may provide the input context as an input 203 to application 139 (FIG. 1).

Figure 3:
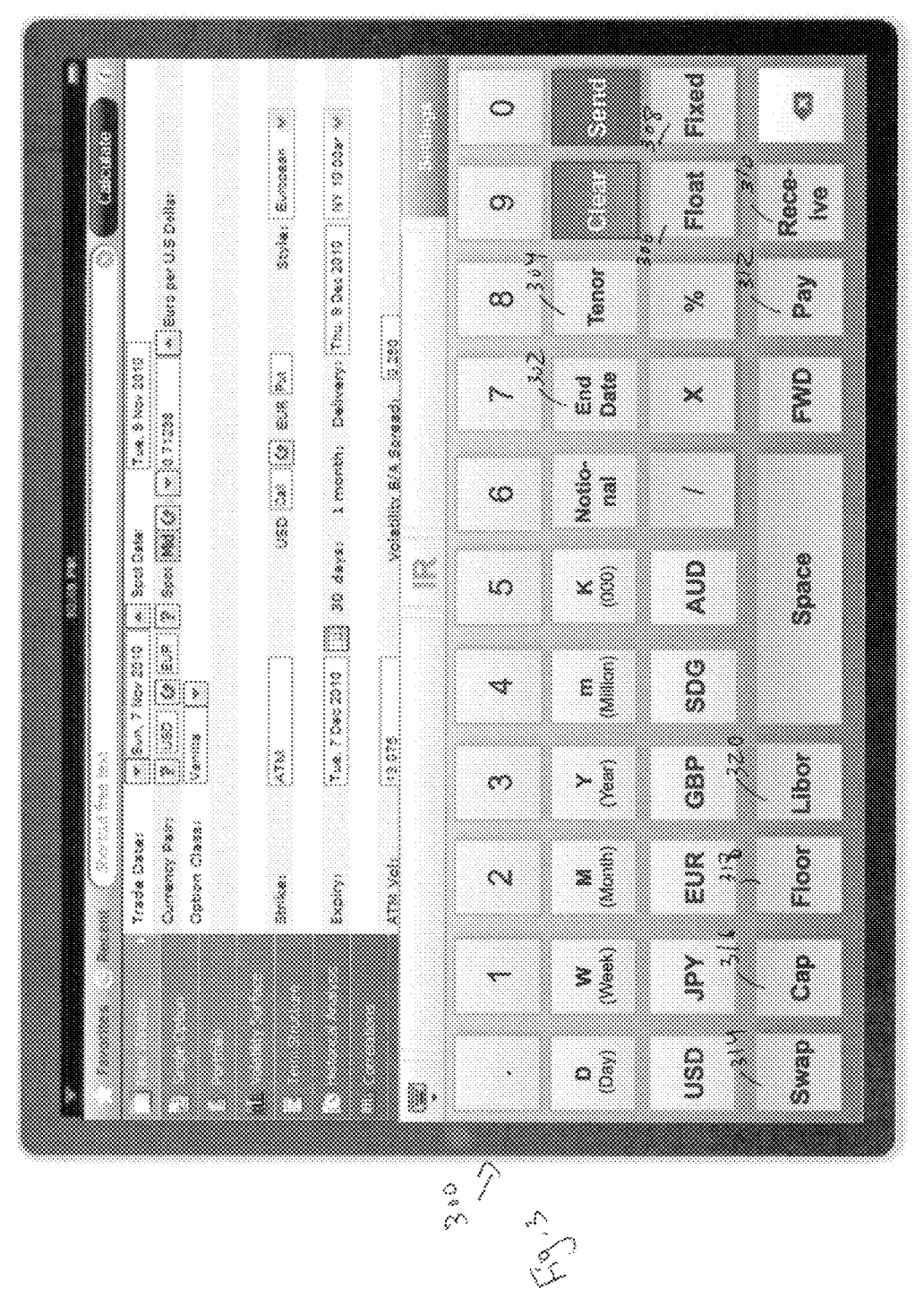

Reference is now made to FIG. 3, which schematically illustrates a context-customized keyboard 300, which is customized for a second input context, in accordance with some demonstrative embodiments. In some demonstrative embodiments, keyboard 300 may perform the functionality of keyboard 160 (FIG. 1).

In some demonstrative embodiments, keyboard 300 may be customized for receiving an input context relating to an interest rate (IR) financial instrument.

As shown in FIG. 3, keyboard 300 may include one or more numerical keyboard elements, one or more period-related keyboard elements, one or more multiplier keyboard elements, one or more operator keyboard elements, a notional keyboard element, a forward keyboard element, currency keyboard elements, a space keyboard element, a backspace keyboard element, a "clear" keyboard element and/or a "send" keyboard element, e.g., as described above with reference to FIG. 2.

As shown in FIG. 3, keyboard 300 may include a plurality of keyboard elements representing a plurality of input elements corresponding to a class component. For example, keyboard 300 may include keyboard elements 314, 316 and 318 representing the classes Swap, Cap and floor, respectively.

As shown in FIG. 3, keyboard 300 may include a plurality of keyboard elements representing a plurality of input elements corresponding to an interest-rate component. For example, keyboard 300 may include a "Libor" keyboard element 320 to be used for defining the Libor interest rate; a "float" keyboard element 306 to be used for defining floating interest rate; and/or a "fixed" keyboard element 308 to be used for defining a fixed interest rate. In one example, the user may define a floating interest rate defined according to the Libor interest rate in intervals of three months, for example, by sequentially selecting keyboard element 306, the keyboard element representing the numeral "3", the keyboard element representing the period "month", and keyboard element 320. In another example, the user may define a fixed interest rate of 5.6%, for example, by sequentially selecting keyboard element 308, the keyboard element representing the numeral "5", the keyboard element representing the decimal point, the keyboard element representing the number "6", and the keyboard element representing the percentage operator.

As shown in FIG. 3, keyboard 300 may include a plurality of keyboard elements representing a plurality of input elements corresponding to a time-period component. For example, keyboard 300 may include an "end date" keyboard element 302 to be used for defining the end-date of the option, and a "tenor" keyboard element 304 to be used for defining a tenor of the option.

As shown in FIG. 3, keyboard 300 may include a "pay" keyboard element 312 and a "receive" keyboard element to be used for defining a payer component and a receiver component, e.g., of a swap option.

Reference is now made to FIG. 4, which schematically illustrates an input context 402 entered by a context-customized keyboard 400, in accordance with some demonstrative embodiments. In some demonstrative embodiments, keyboard 400 may perform the functionality of keyboard 160 (FIG. 1).

As shown in FIG. 4, an input context 402 defining an input context "Vanilla USDJPY ATM 6m 2M" may be defined by a user selecting, e.g., sequentially selecting, keyboard elements "VAN", "USD", "JPY", "ATM", "6", "Month", "2", and "Million".

As shown in FIG. 4, keyboard 400 may include a "DKO" keyboard element to define a digital knock-out option. Keyboard 400 may include a "CCY" keyboard element to define a currency pair of the option.

In some demonstrative embodiments, keyboard 400 may be utilized for entering the context components into a form, e.g., the form shown in the upper portion of FIG. 4. For example, keyboard 400 may include a "TAB" element to allow the user to navigate between different portions of the form. In one example, the user may use the keyboard elements of keyboard 400 to define in the form a first component of the option, e.g., the class, the user may then select the "TAB" keyboard element; followed by selecting keyboard elements defining another component in the form, and so on.

In some demonstrative embodiments, keyboard 400 may be utilized for defining an option to be used for structuring an option portfolio, e.g., including a combination of a plurality of options. For example, as shown in FIG. 4, keyboard 400 may include a keyboard element "Add port." to be used for adding the option defined by the user to a portfolio, e.g., as described below with reference to FIG. 5. For example, the user may select the "Add port." Keyboard element after defining the option.

Reference is now made to FIG. 5, which schematically illustrates an input context 502 entered by a context-customized keyboard 500, in accordance with some demonstrative embodiments. In some demonstrative embodiments, keyboard 500 may perform the functionality of keyboard 160 (FIG. 1).

In some demonstrative embodiments, keyboard 500 may be customized for receiving an input context defining options of a portfolio, e.g., by defining an option ("the added option") relative to another option ("the reference option"), e.g., a previously defined option.

As shown in FIG. 5, keyboard 5 may include an "option" keyboard element to allow the user to define the reference option, and one or more keyboard elements to define one or more components of the added option, e.g., relative to the reference option. For example, as shown in FIG. 5, keyboard 500 may include one or more numerical keyboard elements, one or more operator keyboard elements, a "class" keyboard element, a "strike" keyboard element, an "expiry" keyboard element, a "trigger" keyboard element, e.g., to define a trigger of an option, a "CCY" keyboard element, an "ATM" keyboard element, and the like, e.g., as are described above.

As shown in FIG. 5, an input context 502 defining an added option having a strike greater by 3% with respect to a reference option "option1" may be defined by a user selecting, e.g., sequentially selecting, keyboard elements "option", "1", "(", "strike", ")", "+", "3", and "%".

Figure 6:
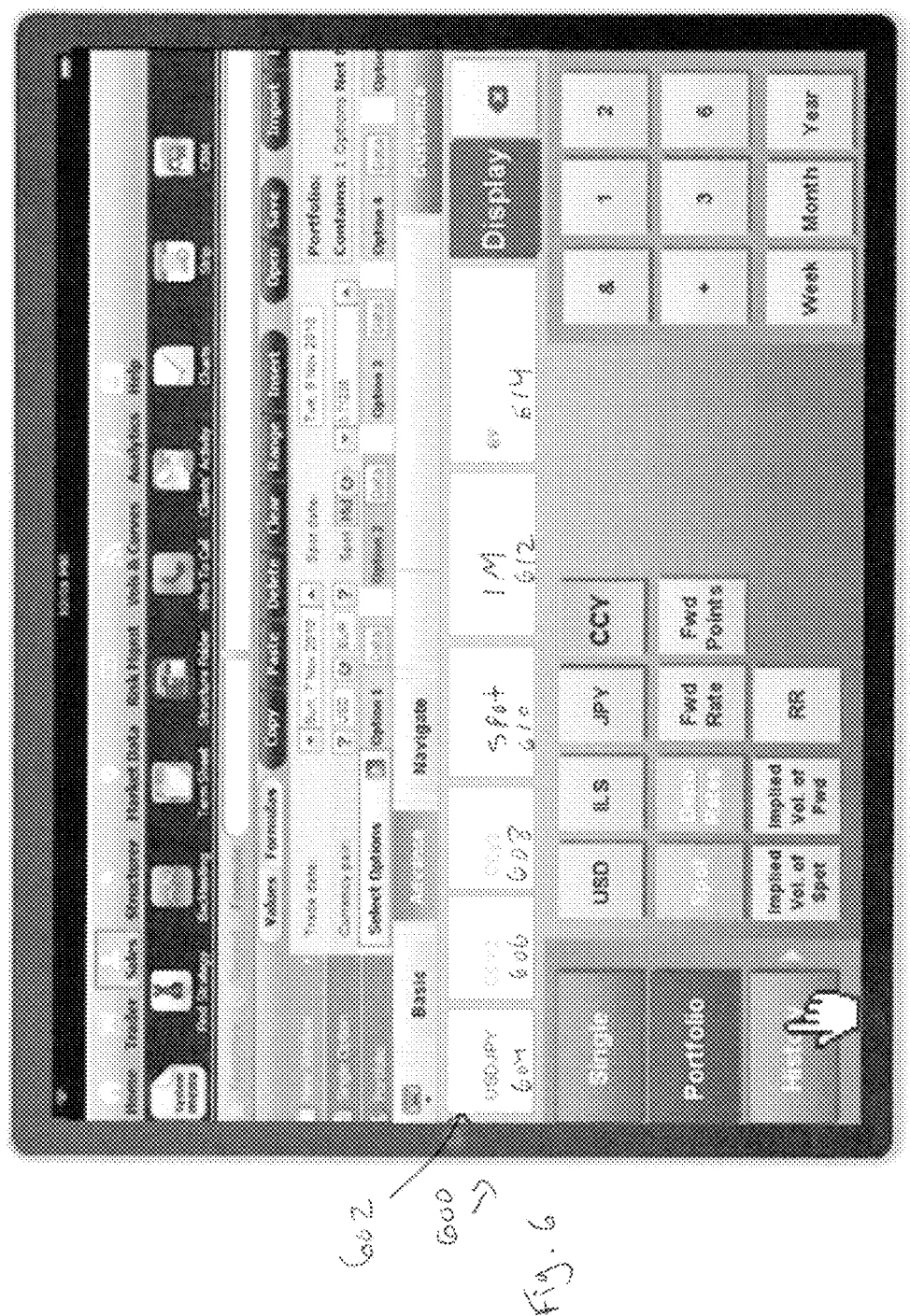

Reference is now made to FIG. 6, which schematically illustrates an input context 602 entered by a context-customized keyboard 600, in accordance with some demonstrative embodiments. In some demonstrative embodiments, keyboard 600 may perform the functionality of keyboard 160 (FIG. 1).

In some demonstrative embodiments, keyboard 600 may be customized for receiving an input context 602 defining a historical analysis to be performed with respect to one or more option-related parameters.

In one example, as shown in FIG. 6, input context 602 may have a predefined structure including a predefined combination of input components. For example, as shown in FIG. 6, the input context may include three currency-pair components 604, 606 and 608 ("CCY1, "CCY2", and "CCY3") to define up to three currency components to be analyzed. As shown in FIG. 6, input context 602 may include a parameter component 610 to define one or more parameters to be analyzed with respect to the defined currency pairs. As shown in FIG. 6, the input context may include two date components 612 and 614 to define a period to be analyzed with respect to the defined currency pairs.

In one example, as shown in FIG. 6, an input context defining an analysis of a historical spot of the currency pair USD-JPY at intervals of 1 month within a period of the past 6 years may be defined by a user selecting, e.g., sequentially selecting, keyboard elements "CCY", "USD", "JPY", "SPOT", "1", "Month", "6", and "Year.

Figure 7:
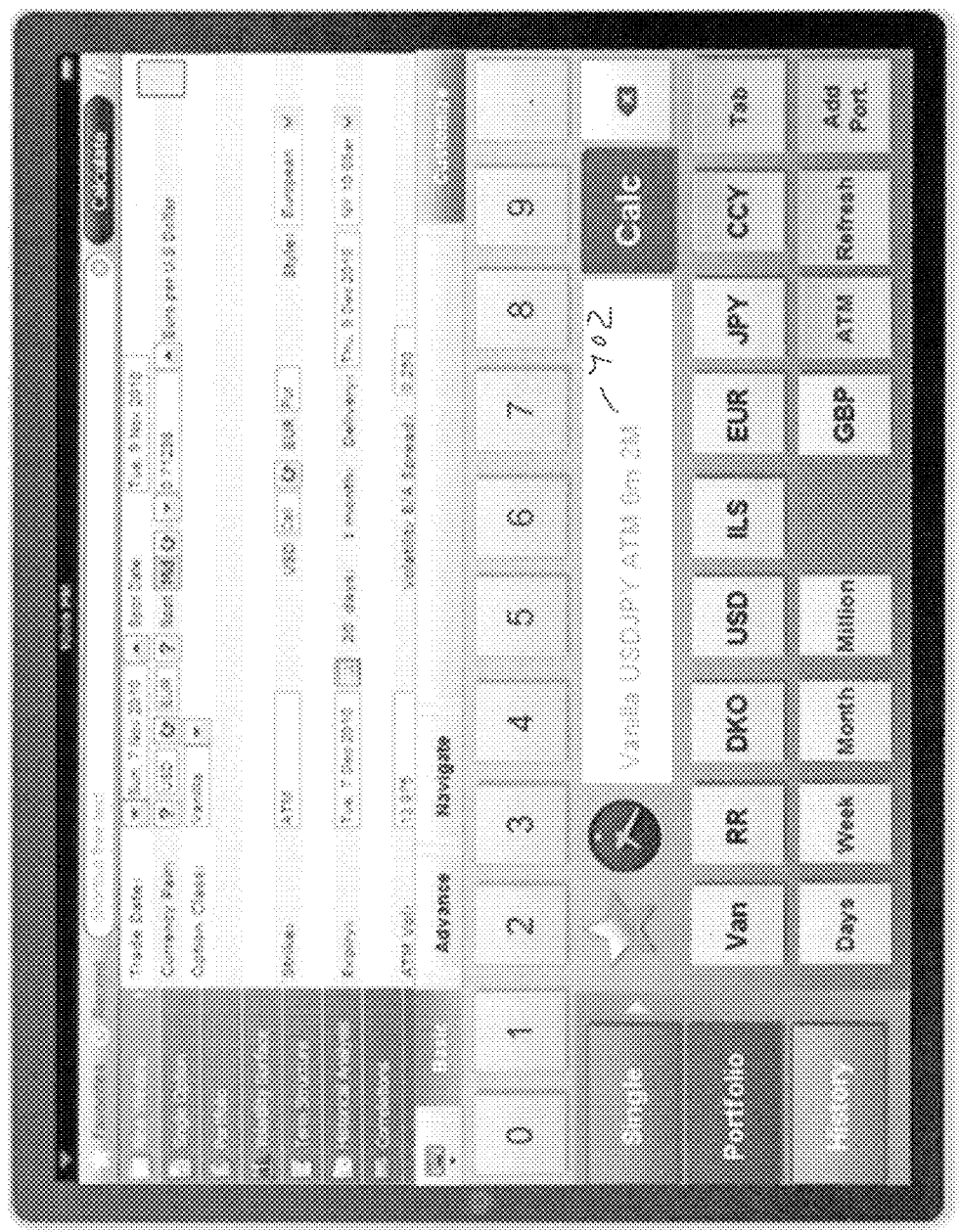

Reference is now made to FIG. 7, which schematically illustrates an input context 702 entered by a context-customized keyboard 700, in accordance with some demonstrative embodiments. In some demonstrative embodiments, keyboard 700 may perform the functionality of keyboard 160 (FIG. 1).

In some demonstrative embodiments, keyboard 700 may be utilized for entering the context components into a form, e.g., the form shown in the left portion of FIG. 7.

Figure 8:
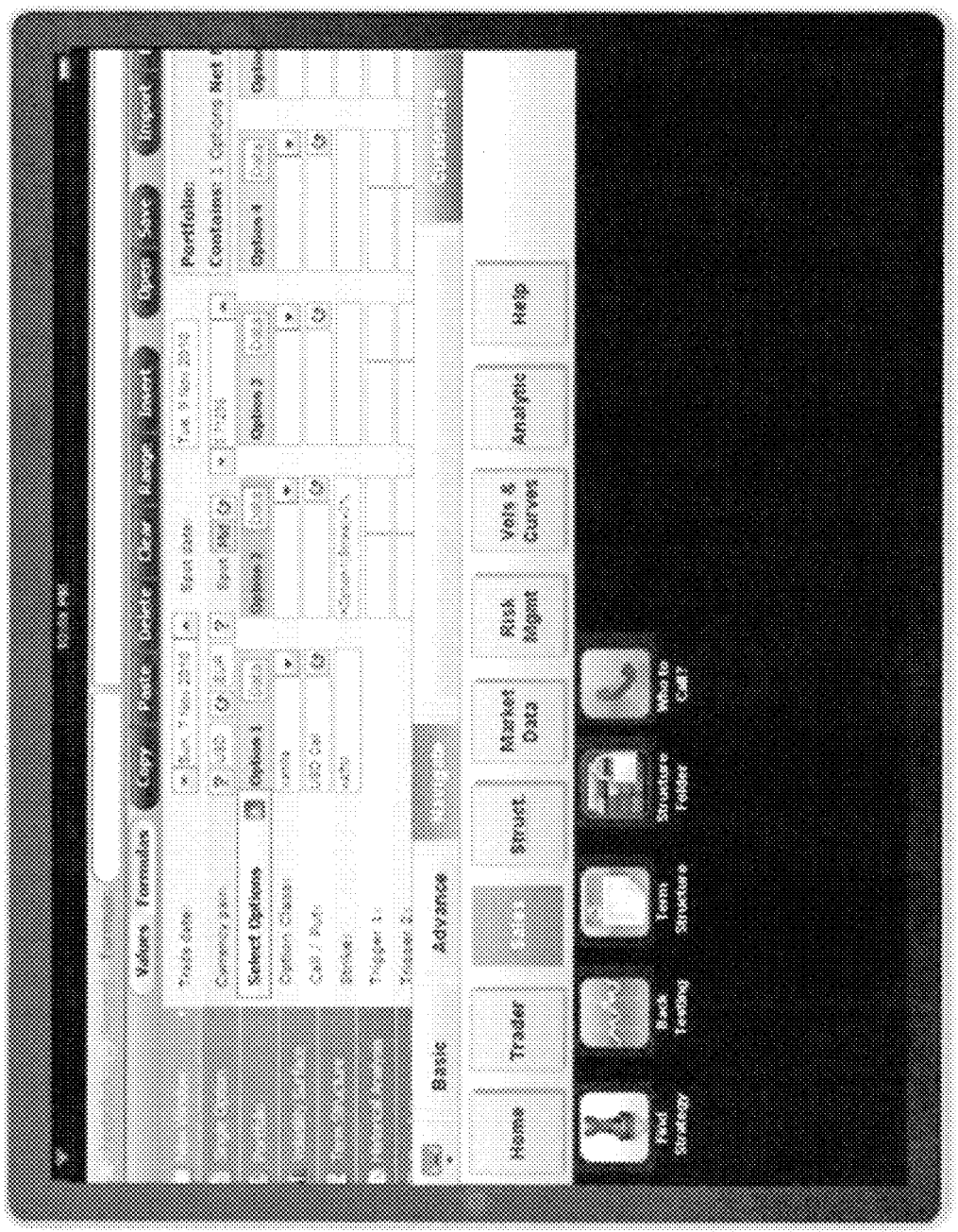
FIG. 8 is a screenshot illustration of a customized navigation keyboard, in accordance with some demonstrative embodiments.

Reference is now made to FIG. 8, which schematically illustrates a customized navigation keyboard 800, in accordance with some demonstrative embodiments. For example, navigation keyboard 800 may be customized for navigating between various application components, e.g., "find a strategy", "back testing" and the like.

Referring back to FIG. 1, in some demonstrative embodiments, the arrangement and/or appearance of one or more keyboard elements of keyboard 160 may be configured, e.g., automatically, dynamically and/or manually, for example, based on user preferences corresponding to the user of device 102 and/or based on the activity of the user of device 102, e.g., as described below.

In some demonstrative embodiments, context-customized keyboard 160 may be modified, e.g., automatically, dynamically and/or manually, for example, to correspond to different types of input contexts, different types of input context components and/or different sets of input elements.

In some demonstrative embodiments, one or more keyboard elements keyboard 160 may be configured based on a frequency of use of the keyboard elements. In one example, keyboard 160 may arrange the keyboard elements in an order, which is based on the frequency of use, e.g., such that a first keyboard element, which is frequently used, may be placed prior to a keyboard element, which is less-frequently used. In another example, size, shape, color. Unused may be deleted In some demonstrative embodiments, one or more keyboard elements may be added to keyboard 160 and/or deleted from keyboard 160, e.g., automatically, dynamically and/or manually, for example, based on user preferences corresponding to the user of device 102 and/or based on the activity of the user of device 102. For example, one or more keyboard elements, which have not been used by the user of device 102, e.g., for a predefined time and/or for defining a predefined number of input contexts, may be deleted from keyboard 160.

In some demonstrative embodiments, keyboard 160 may be dynamically updated, for example, based on a keyboard element selected by the user of device 102.

In some demonstrative embodiments, keyboard 160 may include a concatenated keyboard configuration including a first set of keyboard elements, which includes at least one concatenated keyboard element, which, when selected by the user of device 102, may cause keyboard 160 to switch to a second set of keyboard elements.

In some demonstrative embodiments, keyboard 160 may include a first set of keyboard elements, which includes at least one "expandable" keyboard element representing a second set of keyboard elements. Once the user of device 102 selects the expandable keyboard element, keyboard 160 may switch to provide the second set of keyboard elements.

In one example, the expandable keyboard element may represent a context component and the second set of keyboard elements may include keyboard elements representing a plurality of input elements corresponding to the context component. For example, the first set of keyboard elements may not include keyboard elements relating to specific currencies, and the expandable keyboard element may include a "currency" keyboard element. When the user of device 102 selects the currency keyboard element, keyboard 160 may switch to display a plurality of keyboard elements representing a plurality of currencies, e.g., in addition to or instead of the first set of keyboard elements.

In another example, the expandable keyboard element may represent a plurality of keyboard elements, which are less-frequently used by the user of device 102. For example, keyboard 160 may include a first plurality of keyboard elements representing a first plurality of currencies, e.g., USD, JPY, EUR, which may be, for example, frequently used by the user of device 102; and an expanded keyboard element, e.g., an "additional currencies" keyboard element. When the user of device 102 selects the "additional currencies" keyboard element, keyboard 160 may switch to display a second plurality of keyboard elements representing a second plurality of currencies, e.g., GBP, SDG, ILS, which may be, for example, less-frequently used by the user of device 102, e.g., in addition to or instead of the first plurality of keyboard elements.

In some demonstrative embodiments, keyboard elements of keyboard 160 may be generated and/or defined, e.g., by application 139, interface 111 and/or any other suitable application, based on a definition of the required context components and/or required input elements corresponding to the input context to be received via keyboard 160.

In some demonstrative embodiments, a plurality of available keyboard elements may be predefined, e.g., with respect to a plurality of predefined context components and/or input elements. For example, a text, value and/or string may be assigned to each available keyboard element. A predefined graphical representation may be assigned to each of the available keyboard elements.

In some demonstrative embodiments, a definition of the required context components and required input elements forming a required input context may be received, e.g., from the user of device 102.

In some demonstrative embodiments, a plurality of keyboard elements may be selected from the plurality of available keyboard elements based on the required context components and required input elements; and keyboard 160 may be configured to include the selected keyboard elements.

Figure 9:
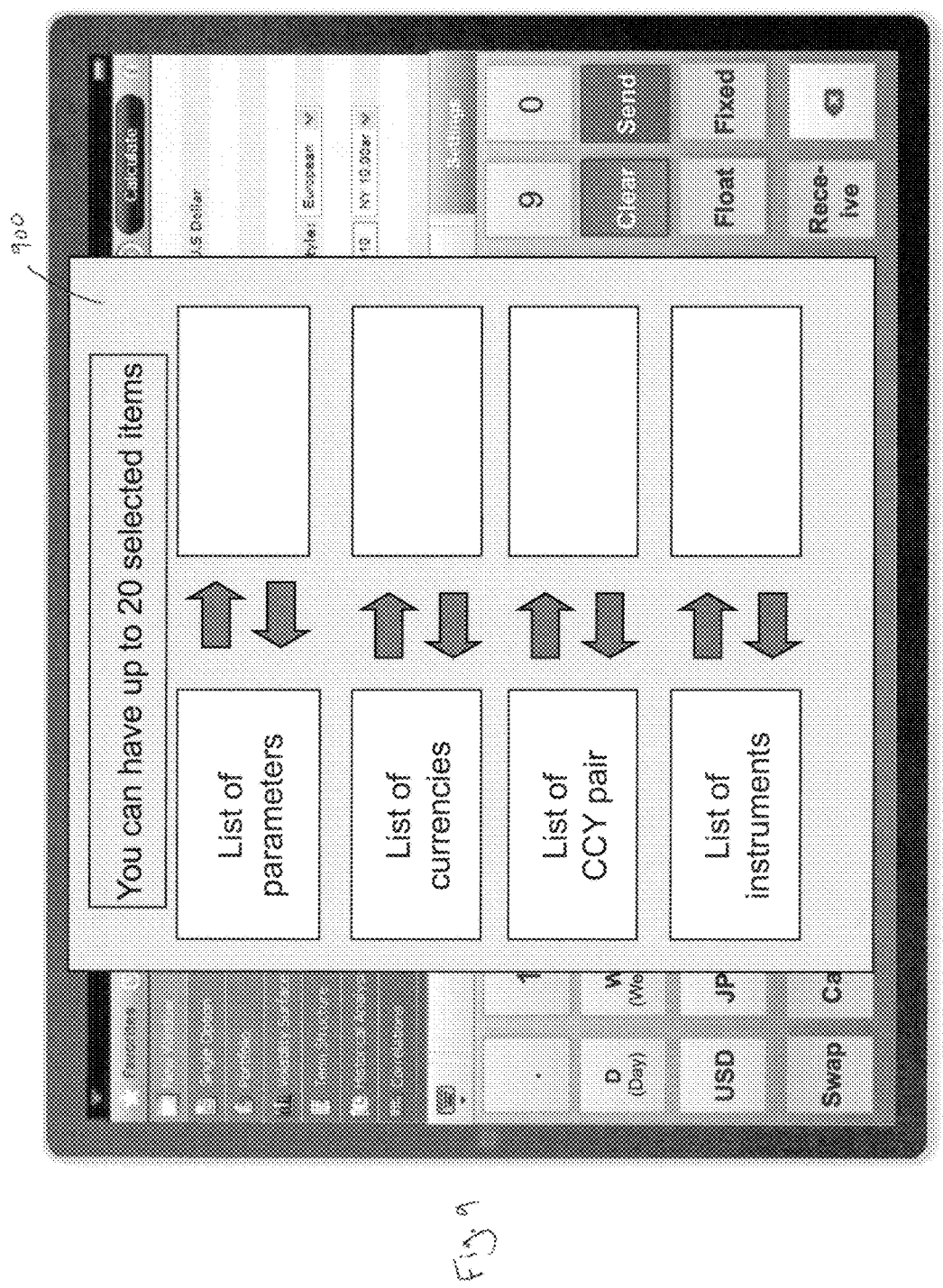
FIG. 9 is a schematic illustration of interface components of an interface for defining a context-customized keyboard, in accordance with some demonstrative embodiments.

FIG. 9 schematically illustrates interface components of an interface 900 for defining a keyboard, in accordance with some demonstrative embodiments. As shown in FIG. 9, interface 900 may include a graphical interface allowing the user to select context components and/or input elements to be represented by the context-customized keyboard. For example, as shown in FIG. 9, interface 900 may provide the user with a list of available parameters, a list of available currencies, a list of currency pairs, and/or a list of instruments. Interface 900 may allow the user to select which of the available parameters, currencies, currency pairs, and/or instruments are to be represented by the customized keyboard.

Figure 10:
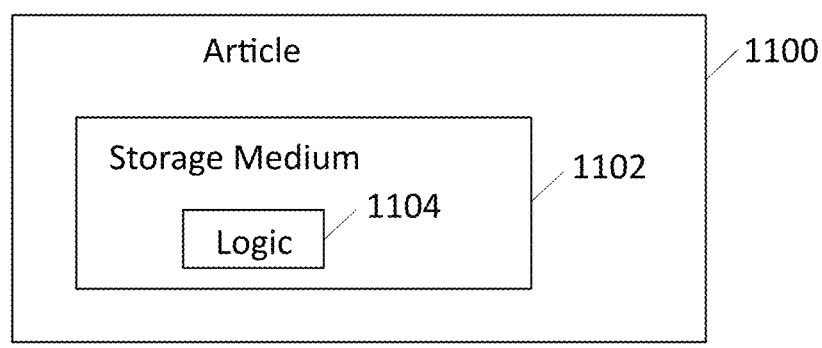
FIG. 10 is schematic illustration of an article of manufacture, in accordance with some demonstrative embodiments.

Reference is made to FIG. 10, which schematically illustrates an article of manufacture 1100, in accordance with some demonstrative embodiments. Article 1100 may include a non-transitory machine-readable storage medium 1102 to store logic 1104, which may be used, for example, to perform at least part of the functionality of keyboard 160 (FIG. 1) and/or interface 111 (FIG. 1); and/or to perform one or more operations described herein. The phrase "non-transitory machine-readable medium" is directed to include all computer-readable media, with the sole exception being a transitory propagating signal.

In some demonstrative embodiments, article 1100 and/or machine-readable storage medium 1102 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, some embodiments are not described with reference to any particular programming language. It will be appreciated that a variety of programming languages may be used to implement the teachings of the invention as described herein.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a memory having stored thereon instructions; and
a processor to execute the instructions, the instructions, when executed by said processor, to result in a virtual context-based keyboard to interface between a user and at least one application, said virtual context-based keyboard is based on an input context to be provided from the user to the at least one application, said input context comprises an input context defining a financial instrument, the input context comprising a predefined combination of a plurality of context components to be defined based on a plurality of predefined sets of input elements, said plurality of context components comprise at least a type component to define a type of the financial instrument and a time period component to define at least one time period corresponding to the financial instrument, said virtual context-based keyboard comprises a plurality of keyboard elements representing input elements of said plurality of sets of input elements, each keyboard element representing a different input element, the input context comprises a combination of N>1 context components, denoted $X_1 \ldots X_N$, an i-th context component, denoted $X_i$, wherein $i=1 \ldots N$, comprising an input element selected from a predefined set of $M_i>1$ input elements, denoted $\{X_{i1}, X_{i2}, \ldots, X_{iMi}\}$, said plurality of keyboard elements comprise keyboard elements representing each of the input elements $\{X_{i1}, X_{i2}, \ldots, X_{iMi}\}$ for all N context components, the plurality of keyboard elements comprising at least one keyboard element representing at least one respective multi-character input element which comprises a string of two or more characters, the plurality of keyboard elements comprising at least a first plurality of keyboard elements representing a respective plurality of different financial instrument types, and a second plurality of keyboard elements representing a respective plurality of different time periods,
wherein the instructions result in providing the input context to said application based on an indication of a sequence of keyboard elements selected by said user from said plurality of keyboard elements, a context component of the input context comprising a particular input element selected from a corresponding set of input elements according to said sequence of keyboard elements, the input context comprising the string of two or more characters responsive to the sequence of keyboard elements comprising the multi-character keyboard element.

2. The apparatus of claim 1, wherein said plurality of context components comprise at least a strike component to define a strike corresponding to the financial instrument, the virtual context-based keyboard comprises at least a third plurality of keyboard elements representing a respective plurality of different types of strikes.

3. The apparatus of claim 1, wherein said plurality of context components comprise at least an interest rate component to define an interest rate corresponding to the financial instrument, the virtual context-based keyboard comprises at least a third plurality of keyboard elements representing a respective plurality of different types of interest rates.

4. The apparatus of claim 1, wherein said plurality of context components comprise at least one component selected from the group consisting of a type of a currency type, a currency pair, an expiration date, an interest rate, and a notional amount,
wherein said plurality of sets of input elements comprise at least one set of input elements selected from the group consisting of a first set of input elements representing a plurality of currency types, a second set of input elements representing a plurality of currency pairs, a third set of input elements representing a plurality of expiration dates, a fourth set of input elements representing a plurality of interest rate types, and a fifth set of input elements representing a plurality of notional amounts,
and wherein said plurality of keyboard elements comprise keyboard elements representing each input element of at least one set of input elements selected from the group consisting of the first, second, third, fourth, or fifth sets of input elements.

5. The apparatus of claim 1, wherein said input context comprises an input context defining a search criterion, the plurality of context components comprising a plurality of search parameters.

6. The apparatus of claim 1, wherein said plurality of keyboard elements comprise at least one reference keyboard element to enable the user to select a reference financial instrument, the instructions resulting in defining the context components of said input context based on one or more context components of the reference financial instrument and the sequence of keyboard elements.

7. The apparatus of claim 1, wherein said plurality of keyboard elements comprise at least one expandable keyboard element representing a set of keyboard elements, the instructions result in switching to present said set of keyboard elements to said user, responsive to said user selecting said expandable keyboard element.

8. The apparatus of claim 7, wherein said expandable keyboard element identifies a particular context component of said plurality of context components, and wherein said set of keyboard elements represent a respective set of input elements corresponding to the particular context component.

9. The apparatus of claim 1, wherein the instructions result in dynamically updating input elements to be represented by one or more keyboard elements of said plurality of keyboard elements based on input from said user.

10. The apparatus of claim 9, wherein the instructions result in updating the input elements to be represented by said one or more keyboard elements based on a frequency of use of the one or more keyboard elements by said user.

11. The apparatus of claim 1, wherein the instructions result in:
providing said user with a list of at least some of the input elements of said plurality of sets of input elements;
receiving from said user an indication of one or more selected input elements; and
updating said plurality of keyboard elements to comprise one or more keyboard elements representing the one or more selected input elements.

12. The apparatus of claim 1, wherein said input context comprises a single input syntax, a single command line, or a single input line.

13. The apparatus of claim 1 comprising a touch screen to display said context-based keyboard, the instructions comprising processing an indication of the sequence of keyboard elements selected by said user from said plurality of keyboard elements on said touch screen.

14. A product comprising a non-transitory machine-readable storage medium having stored thereon instructions, which when executed by a machine, result in:

displaying a virtual context-based keyboard to interface between a user and at least one application, said virtual context-based keyboard is based on an input context to be provided from the user to the at least one application, said input context comprises an input context defining a financial instrument, the input context comprising a predefined combination of a plurality of context components to be defined based on a plurality of predefined sets of input elements, said plurality of context components comprise at least a type component to define a type of the financial instrument and a time period component to define at least one time period corresponding to the financial instrument, said virtual context-based keyboard comprises a plurality of keyboard elements representing input elements of said plurality of sets of input elements, each keyboard element representing a different input element, the input context comprises a combination of $N>1$ context components, denoted $X_1 \ldots X_N$, an i-th context component, denoted $X_i$, wherein $i=1 \ldots N$, comprising an input element selected from a predefined set of $M_i>1$ input elements, denoted $\{X_{i1}, X_{i2}, \ldots, X_{iMi}\}$, said plurality of keyboard elements comprise keyboard elements representing each of the input elements $\{X_{i1}, X_{i2}, \ldots, X_{iMi}\}$ for all N context components, the plurality of keyboard elements comprising at least one keyboard element representing at least one respective multi-character input element which comprises a string of two or more characters, the plurality of keyboard elements comprising at least a first plurality of keyboard elements representing a respective plurality of different financial instrument types, and a second plurality of keyboard elements representing a respective plurality of different time periods;

receiving an indication of a sequence of keyboard elements selected by said user from said plurality of keyboard elements; and providing the input context to said application based on the sequence of keyboard elements, a context component of the input context comprising a particular input element selected from a corresponding set of input elements according to said sequence of keyboard elements, the input context comprising the string of two or more characters responsive to the sequence of keyboard elements comprising the multi-character keyboard element.

15. The product of claim 14, wherein said plurality of context components comprise at least a strike component to define a strike corresponding to the financial instrument, the virtual context-based keyboard comprises at least a third plurality of keyboard elements representing a respective plurality of different types of strikes.

16. The product of claim 14, wherein said plurality of keyboard elements comprise at least one reference keyboard element to enable the user to select a reference financial instrument, the instructions, when executed, result in defining the context components of said input context based on one or more context components of the reference financial instrument and the sequence of keyboard elements.

* * * * *